United States Patent
Ruegenberg et al.

[11] Patent Number: 5,904,413
[45] Date of Patent: May 18, 1999

[54] METHOD AND APPARATUS FOR RECOGNIZING A SKEW ANGLE OF AT LEAST ONE OPTICAL FIBER

[75] Inventors: Gervin Ruegenberg; Bert Zamzow, both of Munich, Germany

[73] Assignee: Siemens Aktiengesellschaft, Munich, Germany

[21] Appl. No.: 08/873,671

[22] Filed: Jun. 12, 1997

[30] Foreign Application Priority Data

Jun. 12, 1996 [DE] Germany .................. 196 23 478

[51] Int. Cl.$^6$ .............. G02B 6/00; G01N 21/00; G01B 11/00

[52] U.S. Cl. .............. 350/96.21; 356/73.1; 356/399; 356/400; 356/445

[58] Field of Search .................. 356/73.1, 399, 356/400, 445; 385/48, 97; 350/96.21

[56] References Cited

U.S. PATENT DOCUMENTS 5,011,259 4/1991 Lieber et al. .
5,096,301 3/1992 Stanley .................. 356/73.1
5,500,913 3/1996 Allen et al. .................. 385/48
5,758,000 5/1998 Zheng .................. 385/97

FOREIGN PATENT DOCUMENTS 0 400 408  12/1990  European Pat. Off. .

Primary Examiner—Frank G. Font
Assistant Examiner—Roy M. Punnoose
Attorney, Agent, or Firm—Hill & Simpson

[57] ABSTRACT

A method for recognizing an angular error between a fiber end, which is aligned with another fiber along a desired axial orientation, by scanning one of the optical fibers along a scanning path, shifting the fiber to a second position in a direction parallel to the desired axial orientation for the fiber and scanning the optical fiber in the second position along the same measuring path, evaluating the intensity of each of the scans to determine the skewed angle for the fiber from the desired axial orientation.

9 Claims, 4 Drawing Sheets

METHOD AND APPARATUS FOR RECOGNIZING A SKEW ANGLE OF AT LEAST ONE OPTICAL FIBER

BACKGROUND OF THE INVENTION

The present invention is directed to a method for recognizing a potential skew angle of at least one optical fiber compared to a desired predetermined alignment direction, wherein the optical fiber is scanned with a scanning means.

U.S. Pat. No. 5,011,259, whose disclosure is incorporated herein by reference thereto and which claims priority from the same German Application as European 0 400 408, discloses a method which can determine a potential skew angle of at least one optical fiber relative to a desired alignment. For recognizing a potential angular error between the longitudinal axes of two light waveguide fiber ends to be aligned relative to one another, the respective fiber end is scanned with the assistance of an image sensor of a video camera while the fiber end is held stationary. The scanning is transverse relative to the longitudinal axis at two separate measuring positions or columns offset relative to one another in the direction of this axis. This known method for recognizing the fiber skew can supply imprecise measured values for the angular value in practice.

SUMMARY OF THE INVENTION

The present invention is based on the object of disclosing a way of how a potential fiber skew of two light waveguide fiber ends to be aligned relative to one another can be more reliably detected. In the method of the present invention, this object is inventively achieved in that the respective optical fiber is scanned in at least first longitudinal position, being scanned at least once transversely relative to its longitudinal axis along a prescribable measuring path, column or gap, and the intensity distribution for the image of the optical fiber is determined along this measuring column, the optical fiber is then shifted from the first longitudinal position into at least a second longitudinal position by a prescribable longitudinal offset along the desired rated alignment direction relative to the scanning means so that, in the second longitudinal position, the optical fiber is scanned at least once transversely relative to its longitudinal axis along the same measuring path or column as in the first longitudinal position, and the intensity distribution for the image of the optical fiber is determined along this measuring column, the skew angle of the respective optical fiber is compared to the desired rated alignment direction to determine from the two scans along one and the same measuring column or path and is offered for further evaluation.

In that the measurement is always carried out along the same, for example one and the same measuring path, the pick-up conditions remain essentially constant, for example the time-invariant. Falsification is the angle measurements are thus largely avoided.

The invention is also directed to an apparatus for the implementation of the inventive method that is characterized in that the scanning means comprising a measuring column that, in at least one first longitudinal position, scans the respective optical fiber at least once transversely relative to the longitudinal axis and determines the intensity distribution for the image of the optical fiber, and that a displacement means is provided that will displace the optical fiber from the first longitudinal position by a prescribed longitudinal offset along a desired rated alignment direction into a second longitudinal position, in that, in this second longitudinal position, the same measuring column as in the first longitudinal position scans the optical fiber at least once transversely relative to its longitudinal axis and determines the intensity distribution for the image of the optical fiber and that an evaluation and calculating means is provided that will determine the skew angle of the respective optical fiber compared to the desired rated alignment direction from the two scans along one and the same measuring column and offer it for further evaluation.

Other advantages and features of the invention will be readily apparent from the following description of the preferred embodiments, the drawings and claims.

DESCRIPTION OF THE PREFERRED EMBODIMENTS

Figure 1:
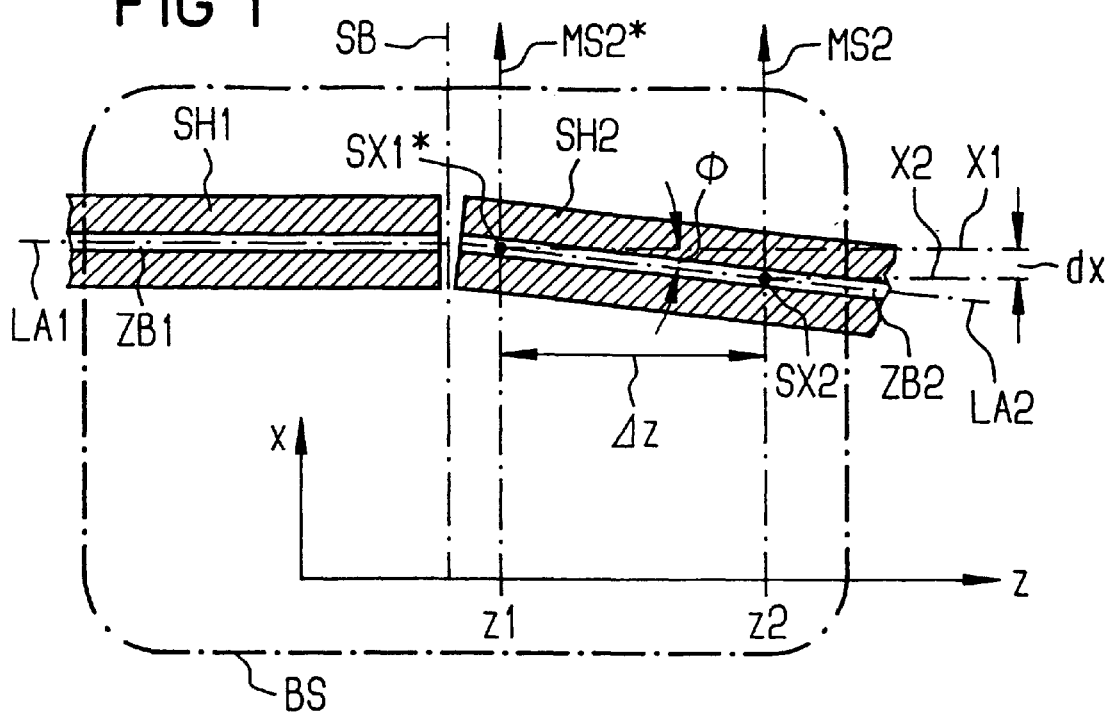
FIGS. 1 and 2 are schematic magnified views of a respective projection plane with the shadow images of two light waveguides residing opposite one another whose respective fiber skew is recognized according to the present invention, with FIG. 1 showing a position during a first scan and FIG. 2 showing the position of the shadows during the second scan.

In schematic as well as enlarged view, FIG. 1 shows a projection plane x/z in which two light waveguide fiber ends are imaged, for example in the form of appertaining shadow images SH1 and SH2. The shadow images SH1 and SH2 can be acquired with the assistance of a measuring apparatus shown in FIG. 3. A first as well as second light waveguide LW1 and LW2 have their end faces residing opposite one another. The respective light waveguides LW1 and LW2 preferably extend along a straight line. For example, the two light waveguides LW1 and LW2 of FIG. 3 should be aligned with optimum alignment relative to one another before they are welded to each other. The coating should be removed in the end region of the light waveguides, so that their fiber ends FE1 and FE2 are bare. The fiber ends or, respectively, optical fibers FE1 and FE2 are held in appropriate holder means HR1 and HR2 of a know type, such as, for example, manipulators. These holder means HR1 and HR2 are arranged on a common base plate GP. At least one of the holder means, HR2 in the present example, is thus fashioned displaceable in at least one direction, particularly transverse to the longitudinal fiber axis, by a corresponding actuator CIU via a control line SMX. It is assumed in the present example that the movement in all three spatial directions, namely x, y and z of a Cartesian coordinate system, is possible with such a displacement means. The spatial direction z thereby prescribes a longitudinal direction, which is the desired rated line of alignment, along which the fiber ends FE1 and FE2 should be directly aligned with one another. The spatial direction x proceeds in a transverse direction to the longitudinal extent of the light waveguides LW1 and LW2, particularly perpendicular and orthogonal to the spatial direction z. The planar base plate GP thus particularly lies parallel to the plane created by the axes or directions x and Z. The spatial direction y extends perpendicular to the x/z-plane and proceeds upward or downward therefrom.

By a light source LQ, a light beam LE is directed with a lens LS1 onto the fiber ends FE1 and FE2 essentially perpendicular to the x/z-plane. Thus, an occlusion of the light beam LE occurs due to these fiber ends FE1 and FE2. The light source LQ thereby preferably sends white light in the direction onto the fiber ends FE1 and FE2 to illuminate them. A halogen lamp, a light-emitting diode or a laser is thus preferably provided as a light source LQ. An additional lens LS2, which is positioned on the opposite side of an essentially rectangular opening OP in the base plate GP is arranged in the beam path of the light beam LE at that side of the fiber ends FE1 and FE2 lying opposite the light source LQ as well as the lens LS1. The lens LS2 projects the shadows SH1 and SH2 of the fiber ends FE1 and FE2 onto a surface or, respectively, images in an image plane that lies in the x/z-plane. In this projection plane, the shadows or projections SH1 and SH2 of the fiber ends FE1 and FE2 are respectively scanned column-by-column along an allocated measuring column or path, namely, respectively, in a direction extending transverse to the longitudinal fiber axes LA1 and LA2 of the light waveguides LW1 and LW2, particularly in a path extending in the x-direction. The scanning event is respectively schematically indicated by arrows MS1 and MS2 that respectively proceed parallel to the line SB that corresponds to the symmetry line of the overall arrangement in the x-direction and marks the exact rated butt location of the end faces of the fiber end FE1 and FE2.

The column-by-column scanning according to the arrows MS1 and MS2 is incrementally undertaken in a radial direction with reference to the respective central fiber axis LA1 and LA2, for example, in the x-direction, with the assistance of a scanning means SCD, so that the intensity distribution in the direction of the x-axis is obtained for each imaging or, respectively, each shadow image SH1 and SH2 of the fiber ends FE1 and FE2. A video camera is preferably provided as a scanning means, the image sensor thereof acquiring a specific image excerpt BS of the x/z-projection that is identified in FIG. 3 with the assistance of a dot-dash, rectangular framing. Within this image excerpt BS, the projection image of the two optical fibers are scanned column-by-column along the two measuring paths or columns MS1 and MS2. The intensity of the respective brightness value of the respective shadow image SH1 or SH2 registered column-by-column are respectively separately transmitted by lines SL1 and SL2 from the scanning means SCD to an evaluation and calculating means COM and are stored therein for evaluation purposes. The separately transmitted intensity information corresponding to the measuring path MS1 or MS2 can be operated with one another in this evaluation and calculating means COM. A display means DPL that serves for the visual display of the intensity distribution acquired along the respective measuring path MS1 or MS2 can also be potentially connected to the evaluation and calculating means COM.

Figure 3:
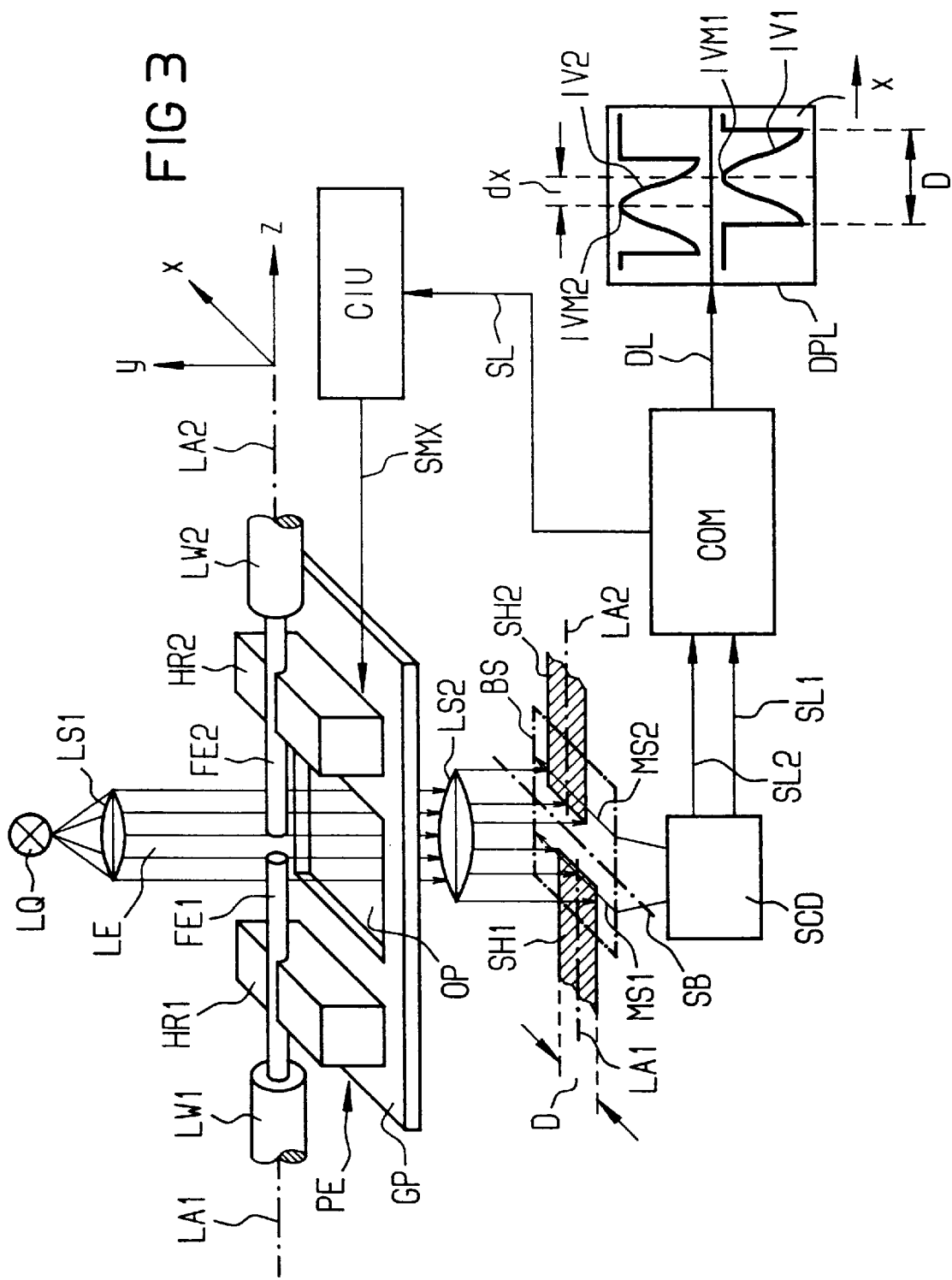
FIG. 3 is a partial perspective illustration schematically showing the basic structure for means for the implementation of the inventive method.

As schematically illustrated in FIG. 3, the two intensity distributions IV1 and IV2 of the two measuring paths MS1 and MS2 have an offset dx in the x-direction that corresponds to the mispositioning in the x-direction and should be turned into zero at the end of the positioning process, for example, before the welding of the light waveguide fiber ends FE1 and FE2 together.

The intensity distribution when scanning transverse to the longitudinal extent of the fiber is explained in detail by way of example below with reference to the curve IV1. The intensity IV1 outside the shadow region SH1, which is outside the diameter D of the fiber end FE1, is high because the light from the light source LQ can propagate completely unimpeded in this area. The intensity distribution drops greatly, namely relatively suddenly, as soon as the outer edge of the shadow image SH1 is reached. However, the intensity IV1 does not remain constant over the entire region D covered by the occlusion, but preferably reaches a maximum in the middle of this shadow region. This is produced by the fact that the bare, clean, decoated optical fiber FE1 acts like a cylindrical lens for the light passing through it. A decrease in the intensity, in turn, symmetrically occurs toward the other edge of the shadow area SH1, and the intensity IV1, in turn, rises abruptly to the original brightness value after leaving the shadow area or shadow image SH1. Given such an axially symmetrical brightness distribution with respect to the longitudinal axis of the respective fiber end, thus, the brightness maximum IVM1 in the region of D corresponds, in particular, to the middle or, respectively, the longitudinal axis of the optical fiber FE1. The evaluation of the maximum IVM1 of the intensity curve IV1 thus makes it advantageously possible to identify the position, in particular, of the longitudinal axis or, respectively, the central axis of the optical fiber FE1. In the same way, the maximum IVM2 of the intensity curve IV2 from the shadow region SH2 preferably defines the position of the longitudinal axis of the optical fiber FE2. The shift of the two maximums IVM1 and IVM2 of the intensity distribution IV1 and IV2 relative to one another is thus proportional to the offset dx of the longitudinal axes LA1 and LA2 of the two light waveguide fiber ends FE1 and FE2 in the x-direction. A displacement of one of the optical fibers, such as, for example, FE2, thus, merely has to be carried out until the displacement dx between the longitudinal axes LA1 and LA2 becomes zero, as a result whereof the alignment of the optical fibers is in alignment in the x/z-plane. This alignment can occur by an operator observing the two intensity distributions IV1 and IV2 of the display means DPL. Potentially, it can be just as expedient to have the alignment carried out automatically by forming the difference dx in the evaluation and calculating means COM. To that end, the evaluation and calculating means COM derives a control signal that is forwarded via a control line SL to the control device or, respectively, actuator CIU. This control signal causes the control device or actuator CIU to displace the holder means HR2 in the x-direction so that the radial offset of the two fiber ends FE1 and FE2 in the x-direction will disappear.

It is especially expedient to subject the intensity distributions IV1 and IV2 to a cross-correlation in the evaluation and calculating means COM, with whose assistance the longitudinal location in the x-direction at which the intensity distributions IV1 and IV2 can be brought largely into coincidence and exhibits a high degree of relationship, can be found. On the basis of the cross-correlation, the evaluation and calculating means generates a setting signal via which the control device CIU implements a displacement of the holder means HR2 in the x-direction until the offset dx has become zero.

In addition to or independently of the column-by-column scanning in the x and z planes, it can also be potentially expedient to implement an alignment of the fiber ends FE1 and FE2 in the y/z-plane, for example in a plane that resides perpendicular to the x/z-plane. When a two-dimensional matching is desired in x-direction as well as the y-direction, then work can be carried out according to the embodiment of FIG. 4. With regard to the light sources and the evaluation means, these are doubly present in this embodiment. The light sources as well as evaluation means allocated to the y/x-plane are respectively additionally identified with an asterisk, *, in the reference character. In detail, a light beam LE* for a light source LQ* is directed with a lens LS1* in an x-direction perpendicular to the y/z-plane onto the fiber ends FE1 and FE2 so that these are illuminated. With the assistance of a further lens LS2*, the light beam occluded by the fiber ends FE1 and FE2 is imaged in a projection plane that lies in the y/z-plane at the side of the fibers FE1, FE2 opposite the light source LQ*. With the assistance of scanner means SCD* corresponding to the scanner means SCD, shadow images SH1* and SH2* for the two illuminated fiber ends FE1 and FE2 are obtained in a way analogous to the x/z projection plane. The respective shadow image SH1 * or SH2* is preferably respectively scanned column-by-column in the y-direction along an allocated measuring column or path and an intensity or, respectively, brightness distribution is thus respectively registered along this measuring path for the fiber ends FE1 and FE2, respectively. Corresponding to FIG. 3, the evaluation of the signals of the two planes residing perpendicular to one another occurs in separate calculating means that are referenced COMX and COMY. Via corresponding control lines SMX and SMY, the holder HR2 is shifted in either the x-direction or y-direction until the aligning alignment of the fiber ends FE1 and FE2 is achieved in both the y/z-plane and the x/z-plane.

In order to avoid the requirement for two light sources and two scanner means, particularly video cameras, it can already be potentially adequate to fashion the base plate GP so that it can pivot through 90° so that the deviation in the x-direction is first identified, for example with the light source LQ1 and the scanning means SCD in a way shown in FIG. 3, and the base plate GP together with the optical lenses LS1 and LS2 and the light source LQ are folded or rotated around the axes of the fibers FE1 and FE2 by 90° into the y/z-plane after the alignment in the x-direction. The positioning means then lies so that the lateral offset, for example the lateral offset in the y-direction dy, can be determined by the light source LQ. The matching in this direction subsequently occurs so that the y-deviation likewise is made zero.

In this way, it becomes possible to recognize a potential radial offset of the two fiber ends FE1 and FE2 in the x as well as the y-direction and to correct it with a corresponding control. The existing arrangement of FIGS. 3 and 4 can also be used for recognizing potential angular errors between the two longitudinal axes LA1 and LA2 of the two fiber ends or, respectively, optical fibers FE1 and FE2. By way of example, FIG. 1 shows schematically a greatly magnified view of such an angular offset between the longitudinal axes LA1 and LA2 of the fiber ends FE1 and FE2. The fiber ends FE1 and FE2 are respectively shown as shadow images SH1 and SH2, which have the form of essentially a rectangular stripe. Since, given the illumination method of FIGS. 3 and 4, they act like cylindrical lenses, they respectively exhibit a maximum of the intensity, preferably in the middle of the fiber and, therefore, along the central axis. This region of great brightness is referenced ZB1 in the shadow image SH1 and referenced ZB2 in the shadow image SH2. At both sides of the bright stripe extending along the respective longitudinal axis, the respective shadow image SH1 or SH2 exhibits an outside region with lower brightness values axially symmetrically thereto that appears darker and that is shaded in FIG. 1. In this way, the maximum of the intensity distribution transverse to the longitudinal extend of the fiber preferably identifies the middle, for example the local position of the longitudinal axis or the central axis of the respective optical fiber. The middle axes or longitudinal axes LA1 and LA2 of the shadow images SH1 and SH2 are respectively indicated in dot-dash lines in FIG. 1. Only a sub-field excerpt of this x/z projection plane is respectively covered with the assistance the respective scanning means, such as, for example, SCD of FIG. 3. In FIG. 1, this image excerpt is identified with the assistance of the rectangular frame BS drawn in dot-dash lines. Within this image excerpt BS, the shadow image SH1 and, thus, the fiber end FE1 extends essentially on a straight line in a z-direction. For example, the fiber end FE1 in FIG. 1 already has its longitudinal axis LA1 aligned with the z-axis, as the desired rated and selected alignment line and assumes this rated position therein. Compared thereto, the shadow image SH2 of the fiber FE2 fashioned as a rectangular stripe proceeds, when viewed from left-to-right, in the form of an obliquely placed beam with a negative gradient slope, for example the shadow image SH2 is skewed with reference to its central axis LA2 by an angle $\phi$ compared to its desired, rated alignment direction, which is the z-direction.

In order to be able to recognize and acquire this skew of the shadow image SH2 and, thus, of the fiber end FE2, the shadow image SH2 is scanned in the x-direction along a measuring path or column MS2 in a first, z-longitudinal position of the fiber end FE2 with the assistance of the scanning means SCD of FIG. 3, and the topical intensity distribution thereof, for example its brightness profile, is registered during this scan event and stored in the evaluation and calculating means COM. By defining, for example, a maximum of this brightness distribution, the local position of the middle axis LA2 of the fiber end FE2 can be determined. In this first longitudinal position, the fiber end FE2 has its end face nearly abutting the end face of the other fiber end FE1, and the fiber end FE2 has its end face brought into the proximity of the symmetry line SB that is co-entered dot-dashed in FIG. 1. A gap preferably remains between the two end faces of the fiber ends FE1 and FE2 residing opposite one another in order to be able to shift the two fiber ends FE1 and FE2 relative to one another without touching, for example for leveling a potential offset in the x and/or in the y-direction. The measuring column or path MS2 is allocated to a defined longitudinal location Z2 in the z-direction from which it runs essentially perpendicular as well as on a straight line in the x/z projection plane. The shadow image SH2 is scanned along this measuring path MS2, the topical intensity distribution or, respectively, intensity profile of the shadow image SH2 is thereby registered, and the topical position of the maximum is determined therefrom. In FIG. 1, the brightness maximum in the x-direction thereby occurs at the location X2, preferably where the measuring path MS2 approximately intersects the middle axis LA2 in the intersection SX2. This location X2 is acquired from the registered intensity distribution of the shadow image SH2 in the evaluation and calculating means and is stored and offered for further interpretation.

As warranted, it can be expedient to multiply scan the shadow image SH2 along the measuring path MS2 at the z-longitudinal location Z2. By subsequent averaging of the registered intensity distribution, optical noise quantities, such as, for example, local defects, dirt or particles on the respective fiber or on the imaging optics, electrical noise quantities in the opto-electronic conversion in the scanner means, such as, for example, SCD, can advantageously be largely suppressed. Viewed overall, at least one scanning transverse to the longitudinal axis of the optical fiber FE2, in particular in the x-direction here, is undertaken along the measuring path MS2, and the intensity distribution for the shadow image or, respectively, projection image of the fiber end FE2 is determined along this measuring path by the scanner and the calculating means COM. The respectively registered intensity distribution is stored in the evaluation and calculating unit COM and offered therein for further evaluation.

In order to recognize a potential skew of the fiber end and/or in order to be able to determine the appertaining skew angle, which is measured between the desired alignment direction and the longitudinal fiber axis, the shadow image or, respectively, the image of the fiber end FE2 is scanned at a second location of its longitudinal extent and transverse thereto, the second location being offset by a prescribable longitudinal distance in the longitudinal direction of the fiber compared to the first scan location. To that end, the optical fiber FE2 is expediently longitudinally shifted by a prescribable longitudinal offset Δz along the z-direction from its first longitudinal position into a second longitudinal position while the scanning means SCD permanently stands still. The end face of the fiber end of FIG. 1 migrates from the rated butt point at the dot-dashed symmetry line SB in the z-direction toward the measuring path MS2, for example the fiber end FE2 particularly moves away from the end face of the other stationarily arranged fiber end FE1 of FIG. 1 along the imaginary extension of the longitudinal axis LA1 into the right-hand half of the Figure. The imaginary extension of the longitudinal axis LA1 thus forms the rated alignment line here, along which the first optical fiber FE1 has been positioned and comes to lie and onto which the second fiber FE2 is to be positioned.

Figure 2:
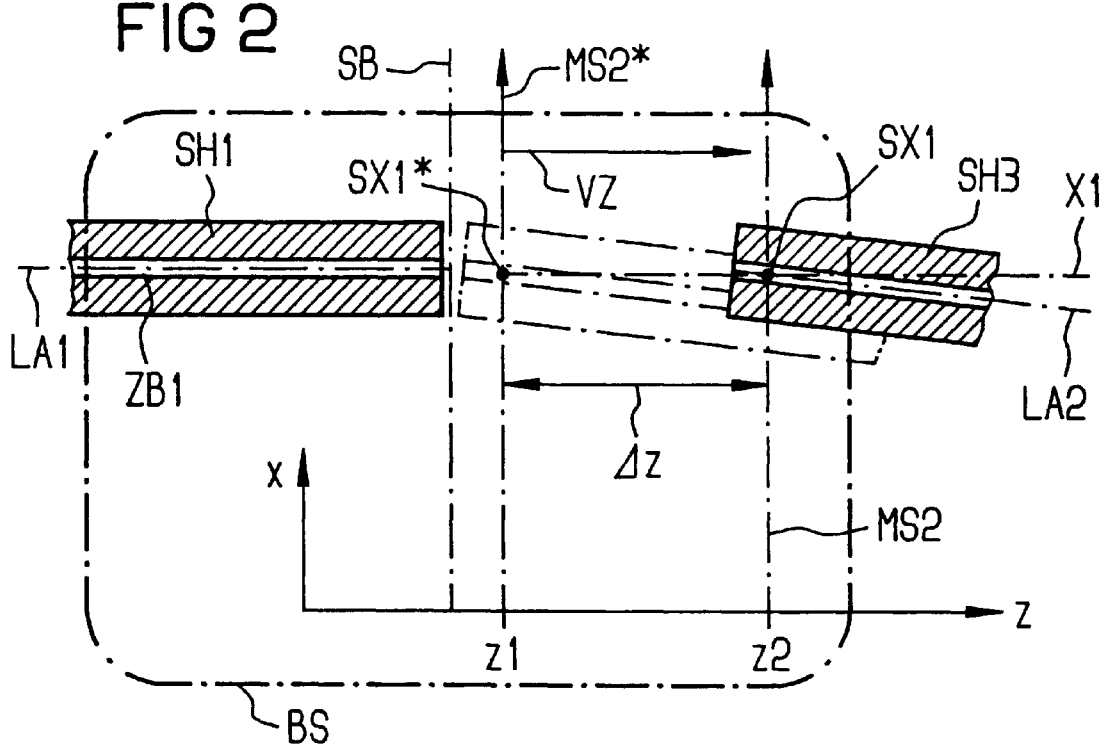

Alternatively and conversely thereto, it can also be potentially expedient to displace the scanning means SCD in parallel compared to the respective fiber end, such as, for example, FE2 along the rated alignment line, such as, for example, LA1, while the fiber end FE2 is maintained in a fixed position. In FIGS. 1 and 2, the dot-dash image edge of the image excerpt BS is moved in the z-direction, whereas the optical fibers FE1 and FE2 are stationarily arranged. It can also be potentially expedient to simultaneously displace the respective fiber end and the scanning means along the desired alignment line relative to one another so that the optical fiber to be respectively checked for skew are scanned transverse to their longitudinal extent with one and the same measuring path at at least two different locations of the longitudinal extent, and their intensity profile can be registered along this one, single measuring path. Expressed in general terms, thus, the respective fiber end, such as, for example, FE2 is brought from its first longitudinal position into at least one second longitudinal position in that it is shifted parallel relative to the scanning means SCD of FIG. 3 along a straight line that preferably corresponds to the desired alignment line for the longitudinal axes LA1 and LA2 of the two fiber ends FE1 and FE2 to be aligned with one another. In the example of FIGS. 1 and 2, the longitudinal axis LA1 of the fiber end FE1 that has already been aligned is selected as the alignment line. In order to be always able to measure with the same and, thus, with only a single measuring path, only a simple relative motion between the optical fiber to be respectively tested and the other components, such as, for example, the imaging means formed by the light source LQ, the base plate GP, the lense LS1 and LS2 and the scanning means SCD. In addition to the displacement of the optical fibers relative to the stationarily arranged component of the imaging means, it is also preferably possible to move only the scanning means, particularly the video camera with its objective, together with the illumination means, that is particularly formed by the light source LQ as well as the lenses LS1 and LS2, and to allow the optical fiber to remain stationary. Given uniform illumination, the movement of only the camera and objective is also possible.

By way of example, in FIG. 2, the longitudinal displacement of the fiber end FE2 in the z-direction, which is the desired alignment direction for the two fiber ends, relative to a stationarily arranged imaging means, particularly the scanning means, such as, for example, SCD of FIG. 3, creates the shadow imagings of the fiber end FE2 in two different longitudinal positions. The shadow image SH2 is indicated in dot-dashed lines in FIG. 2 and identifies the topical position of the fiber end FE1 in its first longitudinal position according to FIG. 1. Proceeding from this first longitudinal position, the fiber end FE2 is displaced parallel into a second longitudinal position along the straight line that corresponds to the desired alignment line of the longitudinal axes LA1 and LA2 of the two fiber ends FE1 and FE2 to be aligned with one another. In FIG. 2, this is a displacement motion in the z-direction from the butt point of the two fiber ends in the direction toward the measuring path MS2, and this direction identified by an arrow VZ. A shadow image SH3 that is longitudinally displaced in the z-direction by a prescribed longitudinal offset Δz compared to the shadow image SH2 occurs for the fiber end FE2 in the second longitudinal position due to the illumination according to FIGS. 3 and 4. The longitudinal offset Δz between the first and second longitudinal positions of the fiber end FE2 is expediently selected so that both the shadow image SH2 for the first longitudinal position fiber end FE2 as well as simultaneously the shadow image SH3 of the second longitudinal position of the fiber end FE2 can be respectively scanned at least once along one and the same stationary measuring column or path MS2 at the same z-longitudinal location Z2. That the fiber end FE1 or its appertaining projection image can be scanned at least once at two different locations of its longitudinal extent transversely relative to its longitudinal axis LA2 with one and the same measuring path at the same stationary location z=Z2 being constant is thus achieved in FIG. 2 in that the fiber end FE2 is longitudinally displaced in the z-direction, whereas the scanning means SCD itself remains stationary.

The measuring path MS2 is expediently allocated to a z-longitudinal location Z2 that lies at an optimally great distance from the symmetry line SB but still within the image excerpt BS covered by the scanning means. The measuring path MS2 thus preferably proceeds along an edge region of that half of the rectangular image excerpt BS that is allocated to the fiber end to be checked, such as, for example, FE2. In FIGS. 1 and 2, the measuring path or column MS2 extends in the x-direction in the right-hand edge zone of the coverable image excerpt BS that is acquired by the scanning means SCD.

Given standard magnifications of the imaging system, such as, for example, corresponding to the imaging optics of U.S. Pat. No. 5,078,489, whose disclosure is incorporated herein by reference thereto, the respective fiber end to be checked for skew is expediently preferably shifted parallel between 0.2 mm and 0.5 mm in the z-direction, for example along the desired alignment line of the two longitudinal axes. To that end, the measuring path MS2 is expediently arranged longitudinally offset by a somewhat greater amount, preferably between 0.21 mm and 0.51 mm, relative to the symmetry line SB in the z-direction.

In that the intensity distribution of the shadow image SH3 along the measuring path MS2 in the x-direction is registered and retained at least once, for example one or more times, the brightness maximum and, thus, the topical position of the optical fiber FE2, preferably the topical position of the longitudinal axis LA2 thereof, in the x-direction can now be determined in the second longitudinal position of the fiber end FE2. In FIG. 2, the brightness maximum of the shadow image SH3 when scanning along the measuring path in the x-direction particularly occurs in the location X1, for example where the measuring path MS2 approximately intersects the middle axis LA2 in the intersection SX1.

Due to the longitudinal displacement of the fiber end FE2 in the z-direction, the optical fiber also changes its topical position in the x-direction along the measuring path MS2. Whereas, thus, the optical fiber FE2 is longitudinally displaced along the desired alignment line relative to the scanning means, its shadow image, due to its skew, migrates along the measuring path so that the optical fiber changes position in the x-direction. In the second longitudinal position of the optical fiber FE2, identified by the shadow SH3 in FIG. 2, the optical fiber thus exhibits a relative height offset in the x-direction compared to its topical position in the first longitudinal position of FIG. 1. A relative topical height offset thus occurs by which the skewed optical fiber migrates along the predetermined measuring path in terms of its height position when it is longitudinally displaced from its first longitudinal position into at least one second longitudinal position along a desired alignment line. The x-coordinates X1 and X2 of the longitudinal axis LA2 can thus be offered in two different longitudinal locations of the longitudinal extent of the fiber end FE2 by measuring along one and the same measuring path MS2. Together with the knowledge of the longitudinal offset $\Delta z$ in the z-direction, the skew angle $\phi$ can be calculated therefrom according to the relationship $\phi = \arctan(dx/\Delta z)$, wherein the difference $dx = X1 - X2$ indicates the height offset by which the brightness maximum determined in the first and in the second longitudinal positions are offset relative to one another in the x-direction. The fraction $dx/\Delta z$ thus corresponds to the slope with which the fiber end FE2 proceeds transversely compared to the desired alignment line in the z-direction.

The relative height offset dx in the x-direction, i.e., the difference X1–X2, can preferably be determined in that the topical intensity distribution of the shadow image SH2 for the first longitudinal position of the fiber end FE2 registered in the x-direction is compared, particularly cross-correlated, with the topical intensity distribution of the shadow image SH3 for the second longitudinal position of the fiber end FE2 registered in the x-direction for the greatest possible relationship degree.

The identified fiber skew angle $\phi$ can then be particularly used for leveling the angular offset of the fiber end FE2. To that end, for example, the evaluation and calculating means COM of FIG. 3 can communicate a corresponding control signal via the control line SL to the control device CIU that correspondingly turns the holder HR2 for the fiber end FE2 in the x/z-plane opposite the skew angle or, respectively, angular error $\phi$. When a leveling of the angular offset is not provided, it can nonetheless be expedient to recognize the angular error in order to take it into consideration in the calculation of the attenuation of two light waveguides that are to be aligned with one another and connected to one another. This is particularly of significance given splicing devices that determine the attenuation with what is referred to as a "transmitted light method" (LID system or "Local Injection and Detection"), since the angular error has influence on the reference value for the attenuation measurement. The LID measurement thereby particularly occurs according to the measuring principles in scanning arrangements of the above-mentioned U.S. Pat. No. 5,078,489.

The inventive principle for recognizing and determining a potential fiber skew angle is expediently separately implemented for each of the two fiber ends of the two light waveguides to be aligned with one another. Thus, it can be particularly expedient for recognizing a potential angular error of the other or first fiber end FE1 of FIG. 1 to provide a separate measuring path analogous to the measuring path MS2 in the left-hand part of the image excerpt BS that, with reference to the center axis of the image excerpt BS, preferably proceeds axially symmetrically to the measuring path MS2 in the x-direction. The measuring procedure along this measuring path for determining a potential angular error of the first fiber end FE1 then proceeds analogous to the measuring method implemented for the second fiber end FE2. In a corresponding way, of course, it is also possible to recognize and determine the respective fiber skew angle of the first as well as the second fiber of the optical fiber pair that is already spliced, particularly welded together.

It can also be expedient to determine a potential angular error of the first optical fiber FE1 with the same measuring path MS2 as in the determining of the skew angle of the second optical fiber FE2. To that end, the optical fiber FE2 of FIG. 2 is moved out of the image excerpt BS, for example in the positive z-direction, toward the right here in FIG. 2, and the optical fiber FE1 to be measured is shifted in the z-direction from the left-hand image half allocated to it into a right-hand image half The measuring procedure then occurs such that the first fiber end FE1 is scanned in at least one longitudinal position at least once transversely relative to its longitudinal axis along this predetermined measuring path MS2 and the intensity distribution for the imaging of the fiber end FE1 along this measuring path is determined. Subsequently, the fiber end FE1 is shifted parallel into at least one second longitudinal position by a prescribed longitudinal offset along the desired alignment line relative to the scanning means so that, in this second longitudinal position, the fiber end FE1 is scanned at least once transversely relative to its longitudinal axis along one and the same measuring path MS2, and the intensity distribution for the imaging of the fiber end FE1 is determined. The skew angle of the fiber FE1, for example the angle that a potentially skewed fiber FE1 describes between its longitudinal axis LA1 and the desired alignment direction, in the z-direction here, can then be determined from the potentially resulting, relative displacement distance of the fiber end FE1 along the measuring path given the longitudinal displacement of the fiber in the z-direction by a prescribed z-distance. The bend angle or, respectively, angular error between the two longitudinal fiber axes then occurs from the difference of 180° minus the sum of the individual fiber skew angles of the two fiber ends, respectively measured between longitudinal fiber axes and alignment lines. Scanning is carried out with one and the same column or path for both optical fibers to be aligned with one another, largely constant, time-invariant recording conditions thus occur, even in the determination of the intensity distribution of two optical fibers.

Given two groups of a plurality, for example at least two light waveguides that reside opposite one another unjoined or that are already spliced to one another, the individual skew angles of the light waveguides in the individual group can preferably be recognized and determined in a way analogous to a single-fiber measuring technology in that a single measuring path is respectively allocated to the whole group. The light waveguides of this respective group are scanned in common in at least one first longitudinal position of the group at least once transversely to their longitudinal axis along this predetermined, allocated measuring path, and the individual intensity distribution for the imaging of each light waveguide of the group is determined along this measuring path. The group of light waveguides is then shifted from its first longitudinal position into at least one second longitudinal position by a prescribable longitudinal offset along a desired rated alignment direction relative to the scanning means so that in this second position, the light waveguides of the group are scanned at least once transversely relative to their longitudinal extent along the same measuring path as in the first longitudinal position and the appertaining individual intensity distributions of the light waveguides of the group are determined. The measuring path thus simultaneously covers all light waveguides of the respective group to be measured transversely relative to the longitudinal extent thereof. The skew angles of the light waveguides of the group can then be individually recognized and determined from the scanning along one and the same measuring path in at least two longitudinal positions of the group.

According to FIGS. 1 and 2, the fiber end FE2 in the first scanning or measuring step is first brought into a first longitudinal position that lies close to the symmetry line SB, for example close to the rated butt point and only thereafter, in a second measuring step, is it moved into the second longitudinal position that is farther away from the symmetry line SB compared to the first longitudinal position. Compared thereto, it can be particularly expedient to implement the inventive measuring method in the reverse sequence and, thus, the respective fiber end, such as, for example, FE2 is brought into a first longitudinal position for scanning along the measuring path MS2 that lies farther away from the rated butt point than the second longitudinal position to be subsequently approached. Such a procedure particularly has the advantage that a potential angular error can already be determined the first time the two fiber ends are brought together, for example already during the laying event in a splicing device.

It can also be potentially expedient to shift the respective fiber end into a further, such as, for example, third longitudinal position along the desired alignment line compared to the first longitudinal position and to repeat the scanning procedure corresponding to the first and second longitudinal positions. In the third longitudinal position, thus, the topical intensity distribution of the image of the optical fiber, such as, for example, FE2 is again registered along the same measuring path transversely relative to the longitudinal extent of the optical fiber. By comparing the topical intensity distribution for the third longitudinal position to the topical intensity distribution for some other, such as, for example, the first longitudinal position, the appertaining height offset along the measuring path can be determined and, together with the known longitudinal displacement distance along the alignment line between the first and third measuring positions, the fiber skew angle can be calculated again, for example anew. In generalized terms, the optical fiber can also be displaced to other longitudinal positions along the predetermined alignment line, the appertaining offset respectively occurring along the measuring path can be measured, and the skew angle can thus be determined therefrom. By averaging this multiply-determined fiber skew angle, measuring imprecisions can be eliminated in an advantageous way. Expressed generally, it can thus be expedient to move the optical fiber to be respectively measured into more than two longitudinal positions relative to the scanning means and to determine the intensity distributions of the shadow images thereat with one and the same measuring path. As a result thereof, the topical position, preferably of the longitudinal axis, of the respective fiber can then be determined at more than two locations of its longitudinal extent and, thus, the angular error can be multiply identified.

Viewed overall, the recognition of the potential angular error between the longitudinal axes of the two light waveguide ends to be aligned in alignment with one another is particularly enabled in that, in at least one first longitudinal position, at least one of the two fiber ends is scanned at least once transversely relative to its longitudinal axis along the prescribable measuring path and the intensity distribution for the image of the fiber end is determined along this measuring path. Subsequently, the respective fiber end is shifted by a prescribable longitudinal offset, preferably along the desired rated alignment line, parallel from the first longitudinal position into at least one second longitudinal position so that in the second longitudinal position, the fiber end is scanned at least once transversely relative to its longitudinal axis along the same measuring path as in the first longitudinal position and the intensity distribution for the imaging of the fiber end can be determined along this measuring path. The skew angle of the respective fiber end can then be determined from the at least two scans along the same measuring path for the two longitudinal positions of the fiber end and can be offered for further evaluation. The bend angle between the two longitudinal fiber axes can then also be calculated from the sum of the skew angles of the optical fibers in that this sum is subtracted from 180°.

In that the scanning is carried out with one and the same measuring path in at least two different longitudinal points of the respective fiber end, largely constant, time-invariant measuring conditions and registration conditions advantageously occur when scanning along the predetermined measuring path. Falsifications in the angle measurement for the respective optical fibers are thus largely avoided. Since the intensity distributions for the imaging of the respective fiber ends are registered with only a single measuring path of the scanning means, location-dependent fluctuations, such as, for example, distortions varying dependent on measuring location, lighting conditions varying dependent on measuring location drop largely out of the measurement. Even given the presence of noise quantities along this one measuring path, it is at most the same noise quantities that can thus enter into each of the measurements. Since, in particular, a relative measurement is implemented in the determination of the height offset, this occurring for the fiber image along the measuring path given the displacement of the respective fiber along the desired alignment direction relative to the scanning means, the angular measurement remains essentially uninfluenced by this. Noise quantities that vary or, respectively, fluctuate from measurement to measurement can thus deteriorate the measured result for the skew angle far less or even not at all, so that a type of measuring homogenization is obtained.

Since measurement is always undertaken along the same predetermined measuring path, it can already potentially suffice for the acquisition of the respective fiber skew angle to provide only one measuring line, such as, for example, a CCD line, as a scanning means. An entire measuring field that covers a large-area image excerpt, such as, for example, given a video camera, is not required.

In practice, a measuring precision (equal to the topical resolution in the x-direction) of clearly better than 500 nm can be achieved with this angle measuring method. Given a displacement distance Δz of about 0.5 mm, a precision of better than φ=arctan °(500 nm/500 μm)≈0.06° is obtained.

In particular, the inventive measuring principle is distinguished in that all components required for the realization (optical system, video camera, shift means for fiber guides) are already present in the required quantity in many splicing devices. The outlay for the realization is therefore limited. With the assistance of high-precision recognition of fiber skew, in particular, determination of splice attenuation according to what is referred to as the LID measuring principle can be implemented significantly more precisely and reliably than was heretofore possible.

Since, according to FIGS. 1 and 2, scanning is always particularly carried out with one and the same stationary measuring path transversely relative to the longitudinal fiber axis, whereas the imaging of the respective optical fiber to be measured is brought to at least two different locations of the desired alignment line, the scanning conditions during the scans remain essentially stable and uniform.

If, by contrast thereto, a potential angular error were determined in that, for example, the respective fiber end is stationary and the imaging thereof is scanned by two different measuring paths of a video camera offset relative to one another in the direction of the longitudinal fiber axis, then different recording conditions would be present in practice along these two prescribed measuring paths. Since the two measuring paths would be defined at different locations of the imaging field of the recording means, particularly video cameras, different imaging conditions and thus, recording qualities would thereby occur along the two measuring paths, which would lead to falsification of the angle measurement. In particular, the following disturbing influences would enter into the measuring result given such a measurement:

A potential skewed position of the recording means, particularly the video camera, could be co-measured;

Since optical systems practically always have a certain distortion or, respectively, aberration that is slightest in the middle of the image and increases toward the edge, the actual fiber course could be displayed falsely. Given, for example, a pillow-shaped distortion, a rectangle could be displayed distorted pillow-like. In this case, a fiber actually proceeding on a straight line would appear slightly curved in the projection image. If, for example in FIG. 1, the shadow image SH2 of the fiber end FE2 were additionally scanned with an additional measuring path MS2*, as indicated in dot-dashed lines, in the proximity of the rated butt point in addition to the scanning with the measuring path MS2, then the registered brightness distribution along the measuring path MS2* would be charged with a lower distortion than along the measuring path MS2 at the image edge. The respective scanning along the two measuring paths MS2* and MS2 at two different locations of the image field BS would thus charge the respective recording of the intensity distribution with different disturbing quantities.

In addition, since the precision of the position determination of the middle fiber axis is dependent on the uniformity of the illumination in the image excerpt covered by the scanning means and similar to the optical distortion, the unwanted effects increase toward the image edge, different illumination conditions would be present along the measuring path MS2 than along the measuring path MS2*. These differences would likewise lead to falsification in determination of the angular error.

Since, by contrast, scanning given the inventive measuring principle is preferably always undertaken only in the same measuring path per optical fiber or even for both optical fibers of a fiber pair to be aligned with one another, such disturbing influences are largely avoided in the present invention. Disturbing influences, such as, for example, due to dew, which is the formation of precipitation on the optics system or the fiber, contamination of the recording system and/or the fiber as well as other deteriorations gradually changing over time also have far less or even no influence on the measuring precision of the angle determination. The suppression of the disturbing influences is particularly all the better the smaller the acquired skew angle. The displacement of the topical position of the optical fibers along the measuring path when changing from the first into the second longitudinal position and, thus, the effect of disturbing factors, such as, for example, optical imaging errors, particularly optical distortions or light fluctuations, namely, is all the smaller the smaller the skew angle of the respective optical fiber.

Figure 5:
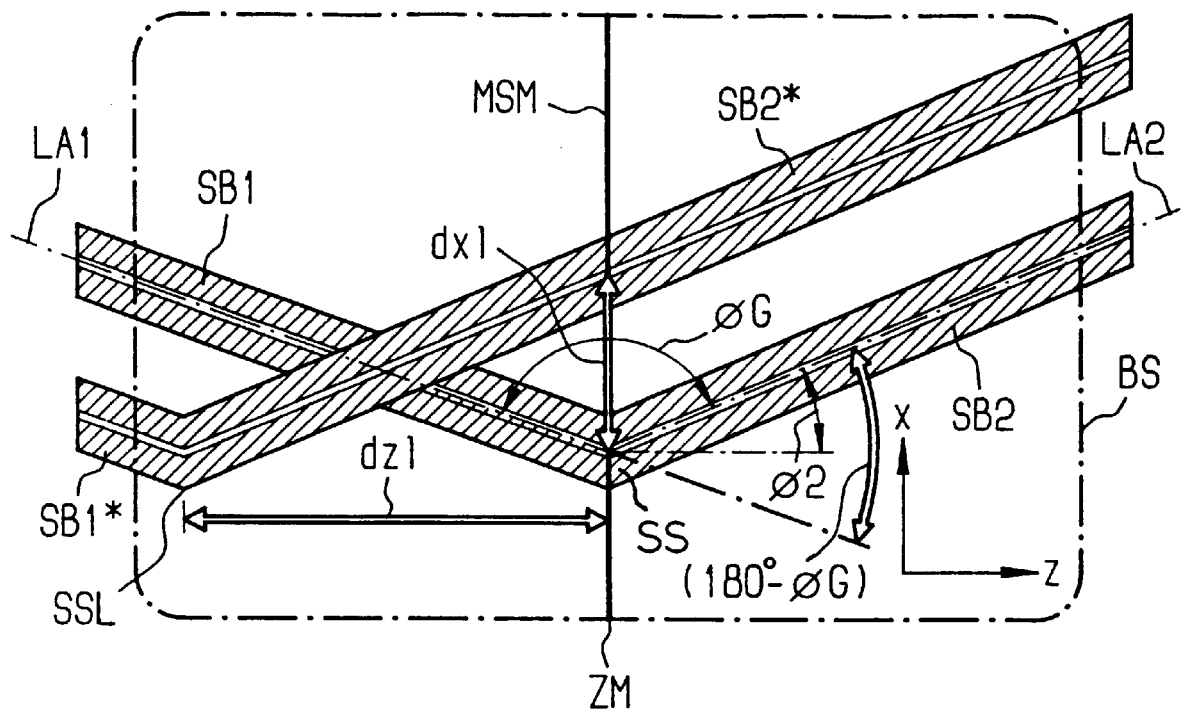
FIGS. 5 and 6 are enlarged shadow images of two fiber ends according to FIGS. 1 and 2 after having been welded together with a potential angular error between the two fiber ends connected to one another, with FIG. 5 showing the two positions used for determining the offset angle of one of the two fibers and FIG. 6 showing the offset angle of the other of the two fibers.
Figure 6:
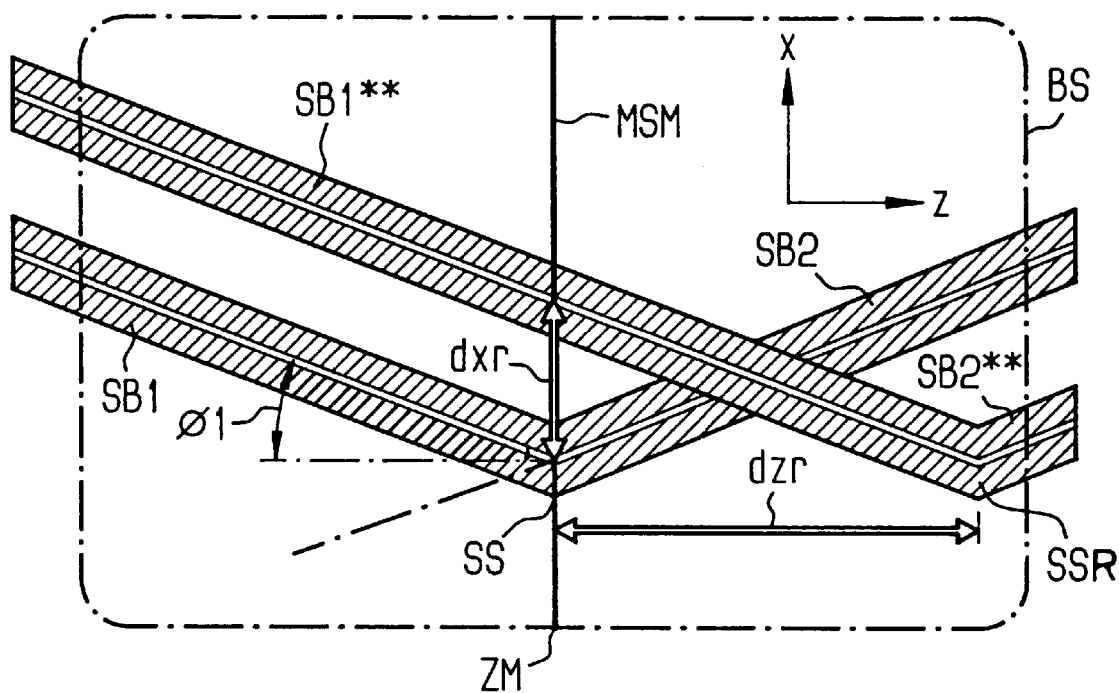

The explanations for FIGS. 1 and 2, as well as FIGS. 5 and 6, in fact, only make reference to the x/z projection plane. The inventive method, however, can be implemented for arbitrary planes of observation and, thus, projection directions transversely, particularly orthogonally, to the respective longitudinal fiber axis. In particular, the comments made about the x/z-plane also apply analogously in the same way to the y/z projection plane. The prescribed measuring path then proceeds in the y-direction. Although the orthogonal axis arrangement wherein, particularly, the x-axis resides perpendicular to the y-axis preferably supplies the greatest possible resolution in the smallest possible measuring error, when compared to other axial arrangements in practice, it can nonetheless also be potentially beneficial to select an angle differing from 90° between the x and y-axis in order to be able to assure a beneficial mechanical structure of the measuring arrangement when given certain space problems. In particular, it can be advantageous to form an angle of about 60° between the x and y axes.

In addition, the comments about FIGS. 1–6 are respectively based thereon in a simplifying fashion that the intensity maximum always lies approximately in the middle of the fiber. This, however, is only assured given a corresponding exact alignment of the illumination, such as, for example, the light source, lens, etc., of the optical fibers and of the imaging optics and, consequently, of the image on the camera chip in one axis. Due, for example, to tolerances in the positioning of the illumination means, optical fibers, imaging means, scanning means, etc., the intensity maximum in practice can therefore potentially no longer lie exactly in the middle of the fiber. This, however, has essentially no influence on the angle measurement, since only a relative measurement is particularly implemented in the inventive measuring method. Only the topical position of the optical fiber to be respectively measured in the first longitudinal position relative to its topical position in its second longitudinal position is thereby determined, for example the positional shift and, thus, the relative offset of the optical fibers along the predetermined individual measuring paths is determined when changing from its first longitudinal position into its second longitudinal position along the desired alignment line. It is therefore largely inconsequential for the inventive measuring principle whether the respective fiber middle, one or both fiber edges and/or the intensity maximum of the brightness distribution is/are utilized for determining the position. The relative displacement of the topical position of the respective optical fiber along the measuring path, which results due to the potential angular error in the parallel displacement of the optical fibers to be investigated relative to the scanning means along the desired alignment line, can therefore be particularly acquired by a crosscorrelation of the two brightness curves along the measuring path for the first as well as the second longitudinal position.

The cross-correlation, namely, only offers a relative statement from the very outset. It is therefore not required to determine the absolute topical position of the respective optical fiber when viewed in the direction of the measuring path for the two measuring positions.

Figure 4:
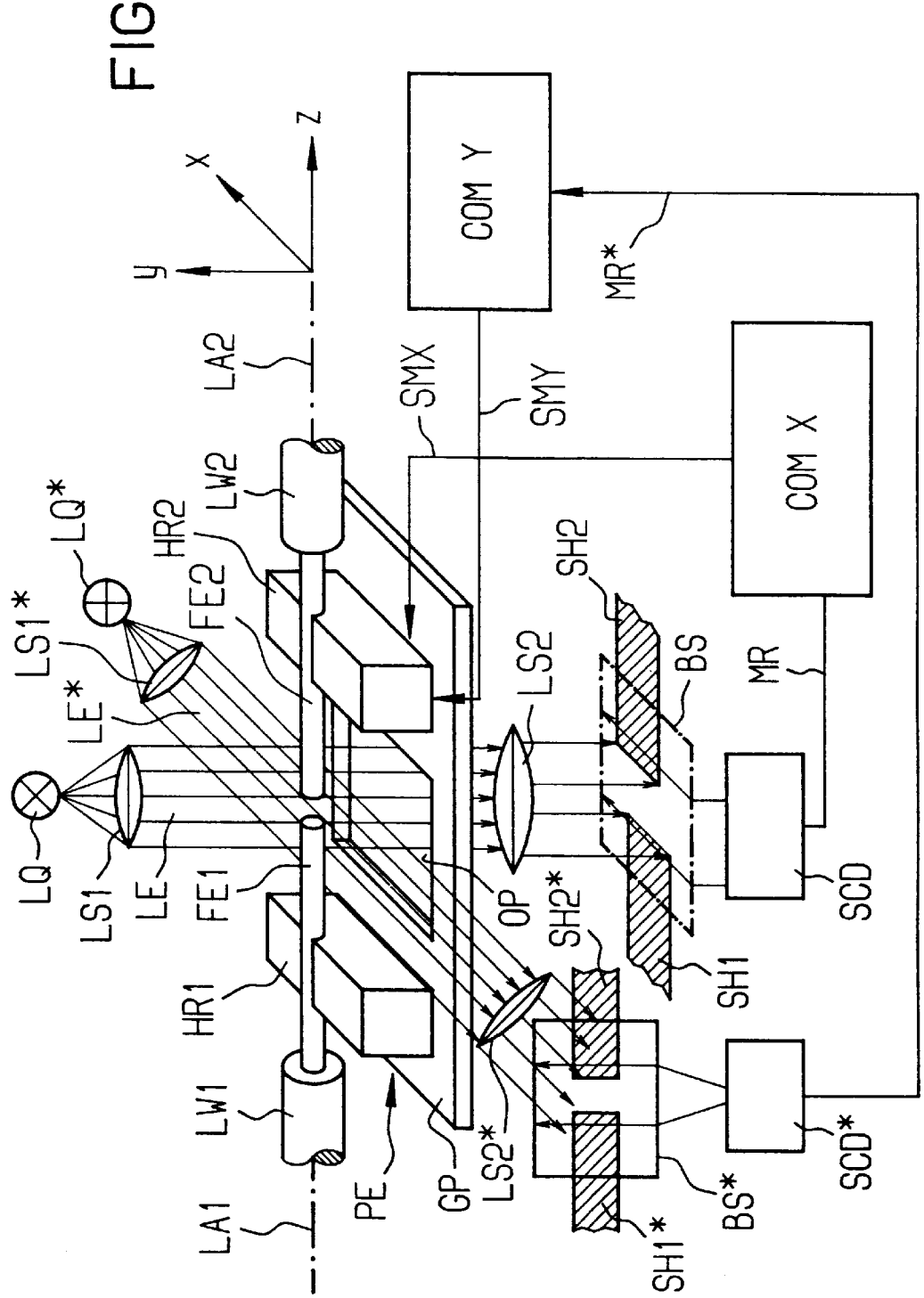
FIG. 4 is a partial perspective illustration schematically showing a modification of the apparatus of FIG. 3 that serves the purpose of implementing the alignment of the fiber ends according to the method of FIGS. 1 and 2 in two planes.

In the inventive angle determination, the respective intensity profile of the optical fibers to be checked for skew along a predetermined measuring path can also be potentially acquired with pick-up systems that are modified compared to those of FIGS. 3 and 4. For example, it can thus already be sufficient to directly project the scanning means, particularly a video camera, onto the optical fibers themselves that are to be measured and not onto their shadow image. The light reflected from the optical fiber is then directly registered as imaging of the optical fibers by the scanning means along a prescribable measuring path transversely relative to the longitudinal fiber axis. Given adequate daylight, the illumination with the light source LQ can thereby be omitted under certain circumstances or the light source can be shut off. It can therefore also already suffice to register the light waveguide or, respectively, the light waveguide sub-section that is still coated and not uncoated and to fix the topical position of the light waveguide in this recorded image.

It is not only the individual skew angle of the respective, unspliced optical fibers, which are measured between the respective longitudinal fiber axis and the rated alignment direction, that can be determined with the assistance of the inventive measuring method before it is spliced to another, allocated, as yet unspliced optical fiber, however, the bend angle between the longitudinal axes of two optical fibers already spliced to one another can also be obtained or determined. FIGS. 5 and 6 illustrate how, for example, in an x/z projection plane the bend angle $\phi G$ between the two optical fibers FE1 and FE2 of FIGS. 1 and 2 can be determined after their splicing. In FIGS. 5 and 6, both the shadow image SB1 of the optical fiber FE1 as well as the shadow image SB2 of the optical fiber FE2 and, thus, the two optical fibers FE1 and FE2 themselves are respectively placed askew by a specific angle $\phi 1$ and $\phi 2$ between their respective longitudinal axis LA1 and LA2 and the z-direction, which is the desired rated alignment direction, expressed in general terms. Since the two fiber ends FE1 and FE2 in the arrangement of FIG. 3 or, respectively, FIG. 4 have now been welded to one another at their end faces with the assistance of a welding means, particularly electrodes, which is not shown herein for the sake of clarity, the two shadow images SB1 and SB2 of FIGS. 5 and 6 are continuously connected to one another and form a single continuous shadow image SB1 plus SB2 overall for the two fiber ends FE1 and FE2, which are spliced to one another. The shadow images of the splice point is respectively referenced SS in FIGS. 5 and 6. The two fiber ends FE1 and FE2 spliced to one another are expediently moved in the positioning arrangement of FIG. 3 or FIG. 4 in the z-direction, for example in the desired alignment direction, and, generally, are brought into a first longitudinal position, such that the shadow image SS of this splice comes to lie approximately on the center line with respect to the image edge of the rectangular image excerpt BS extending in the z-direction. It can be especially expedient to arrange the two spliced fiber ends FE1 and FE2 in the first longitudinal position with respect to the desired alignment direction that the shadow image SS of their splice appears approximately in the center of the rectangular image excerpt BS covered by the scanning means SCD. In this way, a respectively adequately great displacement path for the optical fiber FE1 in a positive as well as for the optical fiber FE2 in a negative z-direction is made available in determining the skew angle $\phi 1$ or, respectively, $\phi 2$ specifically allocated to the respective optical fibers FE1 and FE2.

In FIGS. 5 and 6, measurement is respectively carried out with a respective measuring path MSM that proceeds approximately along the center line of the rectangular image excerpt BS in the x-direction. In this way, the measuring path MSM crosses the shadow region SS of the splice at the z-longitudinal location ZM. At this first longitudinal position ZM of the optical fibers FE1 and FE2 spliced to one another, the shadow region SS of the splice is scanned at least once along the predetermined measuring path MSM and the topical intensity distribution along the measuring path MSM is determined for the imaging of the splice region. The intensity distribution acquired in this way is stored and kept on hand for evaluation purposes in the evaluation and calculating means COM of FIG. 3 or of FIG. 4.

In order to now be able to determine the skew angle $\phi 2$ of the optical fiber FE2, the two interconnected fiber ends FE1 and FE2 proceeding from the shadow region SS of their splice are shifted in common by a specific distance dz1 in a negative z-direction, for example to the left in FIG. 5. This displacement path or, respectively, longitudinal offset dz1 in the negative z-direction, for example along a desired alignment direction, is expediently selected optimally great upon retention of the predetermined edge limits of the image excerpt BS. For greater clarity in FIG. 5, the shadow image for the spliced fiber pair FE1 and FE2 is additionally entered and provided with a reference character SB1* for the optical fiber FE1 and referenced SB2* for the optical fiber FE2. The shadow region of the splice now lies in approximately the left edge of the image excerpt BS and is referenced SSL in this new, second longitudinal position. The displacement motion for determining the fiber skew angle $\phi 2$ for the second optical fiber FE2 thus occurs in the z-direction in the region that was previously allocated to the first optical fiber FE1 when the fibers were in the first longitudinal position and, thus, the image excerpt BS that lies opposite the optical fiber FE2 to be tested with respect to the splice in the first longitudinal position ZM. Whereas the fiber pair is brought from its first longitudinal position in a negative z-direction as imaginary alignment or, respectively, aligning direction into a second longitudinal position, the shadow image of the optical fiber FE2 skewed relative to the z-direction also migrates in the x-direction at the same time. A new subsection of the stripe-shaped shadow image of the second optical fiber FE2 moves into the immediate proximity of the measuring path MSM. The image of the optical fiber FE2 can thus be scanned at least once at a second location of its longitudinal extent with the assistance of one and the same measuring path MSM transversely relative to the longitudinal fiber axis, and the topical intensity distribution can thereby be respectively recorded and registered. As a result of the parallel displacement of the fiber pair along the desired alignment direction relative to the scanning means and, thus, relative to the acquired image excerpt BS, a topical change in position of the optical fiber FE2 also results in the x-direction along the measuring path MSM. This is illustrated in FIG. 5 in that the shadow image SB2* of the optical fiber FE2 in the second z-location position exhibits a height offset in the x-direction along the measuring path MSM relative compared to the shadow image SB2 of the optical fiber FE2 in the first z-longitudinal position. The relative height offset dx1 between the topical position of the shadow image SB2* as well as the topical position of the shadow image SB2 are preferably acquired by evaluating and appertaining the topical intensity distributions along this measuring path MSM for the shadow image SB2 as well as the shadow image SB2*. Particularly advantageously, the height offset dx1 can be determined by cross-correlation of the brightness distribution along the measuring path MSM for the shadow image SB2 as well as the shadow image SB2*. The relationship of measured height offset dx1 to the prescribed longitudinal offset dz1 then yields the slope at which the optical fiber FE2 proceeds obliquely relative to the desired alignment direction, i.e., the z-direction. The skew angle $\phi2$ is obtained by calculation according to the relationship $\phi2=\arctan(dx1/dz1)$.

On the basis of a corresponding procedure, the skew angle $\phi1$ of the optical fiber FE1 can also be recognized and determined. To that end, the spliced fiber pair FE1+FE2 is now, proceeding from its first longitudinal position, wherein the shadow region SS of its splice is allocated to the longitudinal position ZM and is shifted in a positive z-direction by a prescribable longitudinal displacement distance dzr into a new, second longitudinal position. In order to illustrate this better, the shadow image of this longitudinal displaced fiber pair is likewise additionally entered in FIG. 6. The shadow image of the optical fiber FE1 is thus referenced SB1 and the shadow image of the optical fiber FE2 is referenced SB2. In this new, second longitudinal position, the shadow region of the splice is referenced SSR. As a result of the skew of the optical fiber FE1, the parallel displacement by the displacement distance dzr along the positive z-direction, as the desired alignment direction likewise effects a relative displacement of the topical position of the optical fiber FE1 in the x-direction along the measuring path MSM. The height offset dxr thus occurs between the chronologically successive recording brightness profiles of the image SB1 for the first longitudinal position and the image SB1** for the second longitudinal position of the optical fiber FE1. In that the fiber pair is moved into the right-hand half of the image of the image excerpt BS by the longitudinal offset dzr, the image of the optical fiber FE1 can be scanned by one and the same measuring path MSM transversely relative to the longitudinal fiber axis at another location of the longitudinal extent thereof. The skew angle $\phi1$ of the optical fiber FE1 is thus particularly calculated according to the relationship $\phi1=\arctan(dxr/dzr)$, wherein the relationship dxr/dzr indicates the slope at which the optical fiber FE1 proceeds obliquely relative to the desired alignment direction or the z-direction. The bend angle $\phi G$ of FIG. 5 can thus be particularly calculated according to the relationship $\phi G=180° (\phi1+\phi2)$.

In that the fiber pair is brought into a first measuring position wherein the image of the splice region can be scanned with the measuring path MSM and proceeding from this first measuring position, the fiber pair is displaced into a second longitudinal position to the left and to the right of the measuring path, i.e., in alternation, and scanning is thereby respectively in turn undertaken along one and the same measuring paths as in the first longitudinal position, the bend angle $\phi G$ can already be advantageously determined with only three scans.

Of course, the bend angle between the two optical fibers FE1 and FE2, which were spliced together by a weld to one another, can also be determined in that the measuring step recited for FIGS. 1–4 are respectively advantageously separately implemented for each of the two optical fibers. Per optical fiber, at least two scans at at least two locations along the longitudinal course of the respective optical fiber are thereby expediently implemented with the specifically allocated, same measuring paths.

Although various minor modifications may be suggested by those versed in the art, it should be understood that we wish to embody within the scope of the patent granted hereon all such modifications as reasonably and properly come within the scope of our contribution to the art.

We claim:

1. A method for recognizing a potential skew angle of at least one optical fiber compared to a desired rated alignment direction, said method comprising the steps of positioning the optical fiber in a first longitudinal position, scanning the optical fiber at least once transverse to its longitudinal axis along a prescribed measuring path, determining the intensity distribution of the image of the optical fiber, then displacing the optical fiber from the first longitudinal position into a second longitudinal position by a prescribable longitudinal offset along the desired rated alignment direction relative to the scanning arrangement, then scanning the optical fiber in the second longitudinal position along the same measuring path used for the first scanning in the first longitudinal position and determining the intensity distribution for the image of the optical fiber along this measuring path while in the second longitudinal position, and then comparing the first intensity distribution with the second intensity distribution to determine the skew angle.

2. A method according to claim 1, wherein the step of comparing the intensity distributions of the two scans includes cross-correlating the intensity distribution to one another and in that the potential positional change of the respective optical fiber along the defined measuring path in the displacement motion from the first to the second longitudinal position is determined from this cross-correlation.

3. A method according to claim 1, wherein the respective optical fiber is shifted parallel relative to the scanning means along the rated alignment direction while the scanning means is maintained stationary.

4. A method according to claim 1, wherein the scanning means is shifted parallel relative to the respective optical fiber along the rated alignment direction while the optical fiber stands still.

5. A method according to claim 1, wherein the respective optical fiber is scanned along the predetermined measuring path at an outer image edge of the image excerpt that can be covered by the scanning means.

6. A method according to claim 1, which includes illuminating the optical fiber with the fiber acting as a cylindrical lens to produce a shadow image of the fiber with the intensity of the image being used for the evaluation.

7. A method according to claim 1, wherein a second optical fiber allocated to the first optical fiber is aligned in alignment with the first optical fiber.

8. A method according to claim 7, wherein the two optical fibers are scanned along one and the same measuring paths.

9. An apparatus for determining a potential skew angle of at least one optical fiber, said apparatus including a displacement means for holding the optical fiber and being displaceable from a first longitudinal position along a rated alignment direction to a second longitudinal position, scanning means including a measuring path extending transverse to the rated alignment direction for scanning the optical fiber in a first position and scanning the fiber when displaced by the displacement means to a second longitudinal position, said scanning means determining the intensity distribution for an image of the optical fiber taken along said measuring path while the fiber is in each of said positions, and evaluation and calculating means for evaluating the intensity distribution taken at the measuring path from with the optical fiber in the two positions to determine a skew angle of the respective optical fiber relative to the desired alignment direction from the two scans.

* * * * *